Figure 1:
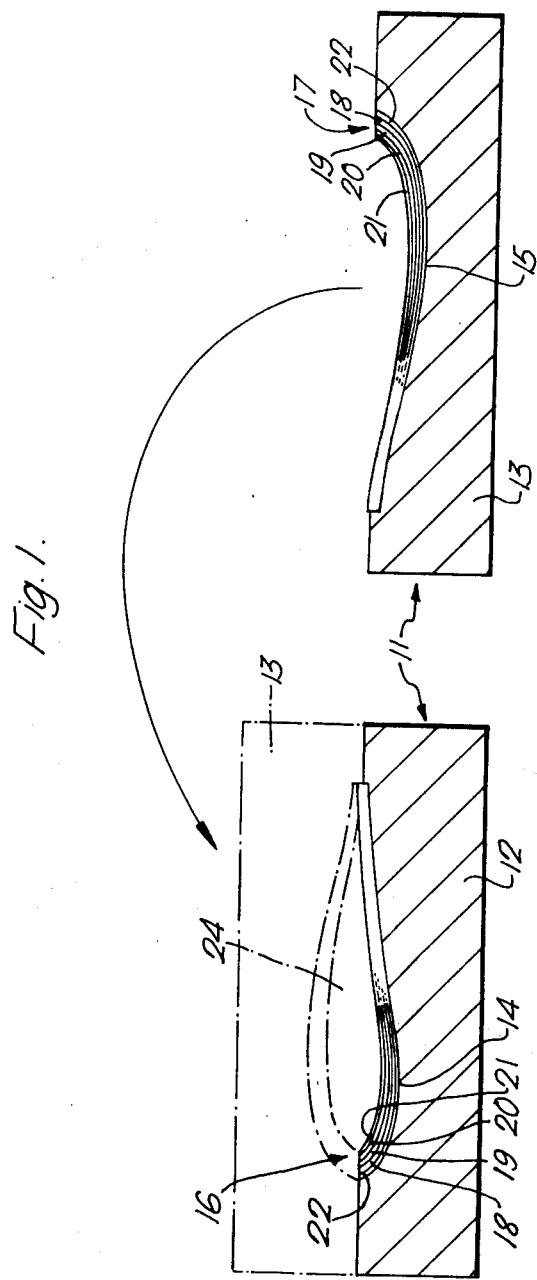

United States Patent [19]

McCarthy

[11] 4,268,571
[45] May 19, 1981

[54] FOAM-CONTAINING STRUCTURES
[75] Inventor: Roy F. J. McCarthy, Cheltenham, England
[73] Assignee: Dowty Rotol Limited, Gloucester, England
[21] Appl. No.: 71,385
[22] Filed: Aug. 30, 1979
[30] Foreign Application Priority Data
Sep. 16, 1978 [GB] United Kingdom ............ 37125/78
[51] Int. Cl.³ ............... B32B 5/20; B64C 11/26; B29D 27/04
[52] U.S. Cl. .................. 428/236; 264/46.6; 264/46.9; 416/229 R; 428/251; 428/313
[58] Field of Search .......... 264/46.6, 46.9, 45.3; 416/229 R; 428/236, 251, 313

[56] References Cited
U.S. PATENT DOCUMENTS

| | | |
|---|---|---|
| 2,484,141 | 10/1949 | Alex . |
| 2,728,702 | 12/1955 | Simon et al. ............ 264/46.6 X |
| 3,286,004 | 11/1966 | Hill et al. ............ 264/46.6 |
| 3,431,331 | 3/1969 | Pincus et al. ............ 264/46.6 X |

FOREIGN PATENT DOCUMENTS 676381 7/1952 United Kingdom .
827736 2/1960 United Kingdom .

*Primary Examiner*—Philip Anderson
*Attorney, Agent, or Firm*—Young & Thompson

[57] ABSTRACT

Ths invention relates to a method of making a foam-containing structure which includes placing and suitably retaining a respective shaped sheet in each of first and second complementary parts of an open mould. Each sheet includes at least one layer of fibrous material and on that face thereof remote from the respective mould part at least one filter layer. When the two mould parts are closed together a foamable material is introduced into a cavity formed between the sheets and is then caused to expand. Some of the expanding material passes through the filter layers into the fibrous material, the characteristics of those layers being so chosen as to produce a desired extent of penetration of the expanding material into the fibrous material.

13 Claims, 5 Drawing Figures

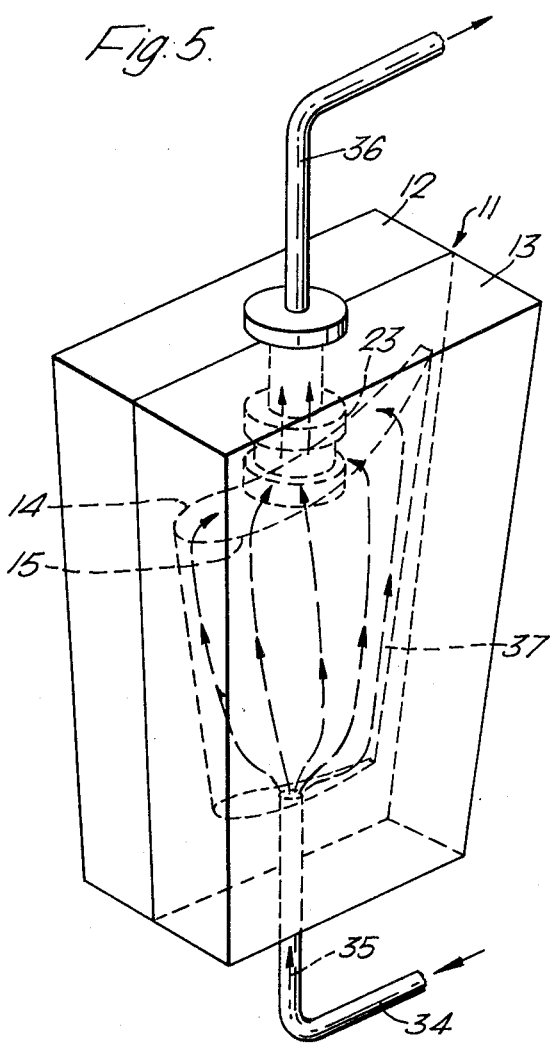

FOAM-CONTAINING STRUCTURES

This invention relates to a method of making foam-containing structures, and to foam-containing structures, for example blades for fitment to a rotor, produced by the method.

A method of making a foam-containing structure is known in which two halves of a shell formation of fibre-reinforced plastics materials are firstly formed in respective moulds. Following curing the two halves are united to form the shell into the interior of which a foamable material is then introduced. The foamable material is thereafter caused to expand to provide a foam core within the shell formation. With such a method not only has it been necessary to provide a separate mould for producing each of the two halves of the shell formation, but it has also been necessary to subject the inner surfaces of the halves, following curing, to an abrading process in order to achieve bonding between the foam core and the shell formation. This abrading process has been found to be difficult and time-consuming, and said bonding has not always been satisfactory.

Another method of making a foam-containing structure is known in which a foam core is firstly formed in its own mould. This core is then subjected to an abrading process and layers of fibrous material are next laid up on the core. The assembly is then placed in another mould and the fibrous material subjected to a resin-injection process. This method therefore requires the provision of two separate moulds. Further, the abrading process has proved to be time-consuming and difficulty has been experienced in controlling the amount of material removed, resulting in dimensional and shape inaccuracies in the foam core. Where a foam core is of large dimensions handling difficulties have been encountered and damage occurred.

In yet another method of making a foam-containing structure, intended to overcome the difficulties experienced with the methods mentioned in the last two paragraphs, sheets of fibrous material are respectively laid in the two halves of a mould. These sheets are suitably retained in the mould halves, the mould closed and then foamable material is introduced into the space bounded by the fibrous material. The foamable material is thereafter caused to expand to provide a foam core and to penetrate the fibrous sheets in order to achieve desired bonding therewith. However, it has been found that upon such expansion of the foamable material, penetration of that material into the sheets of fibrous material occurs in an uncontrolled manner, with the result that the depth of penetration of the foamed material into the fibrous material is inconsistent. Thus, the distribution of the foamed material in the fribrous material has been far from uniform, resulting in an uneven weight distribution in the final product. Whilst such uneven weight distribution might be tolerated in certain applications of the structures so formed, in other applications such as blades for propellers and fans, where accuracy in balance is vital, such uneven distribution must be avoided.

The invention is intended to provide a remedy. It solves the problem, experienced in the method mentioned in the last paragraph, of uncontrolled penetration of material, which is being foamed, into sheets of fibrous material laid up in a mould.

The advantages offered by the invention are mainly that a method is provided which results in structures which have better-controlled weight distribution and which are thus stronger and more reliable in use. Also the method affords economies over previous methods of producing such structures.

One way of carrying out the invention is described in detail below with reference to drawings which illustrate only one specific embodiment, in which:

FIG. 1 shows first and second complementary parts of a mould in the open condition with fibrous material laid therein.

Figure 2:
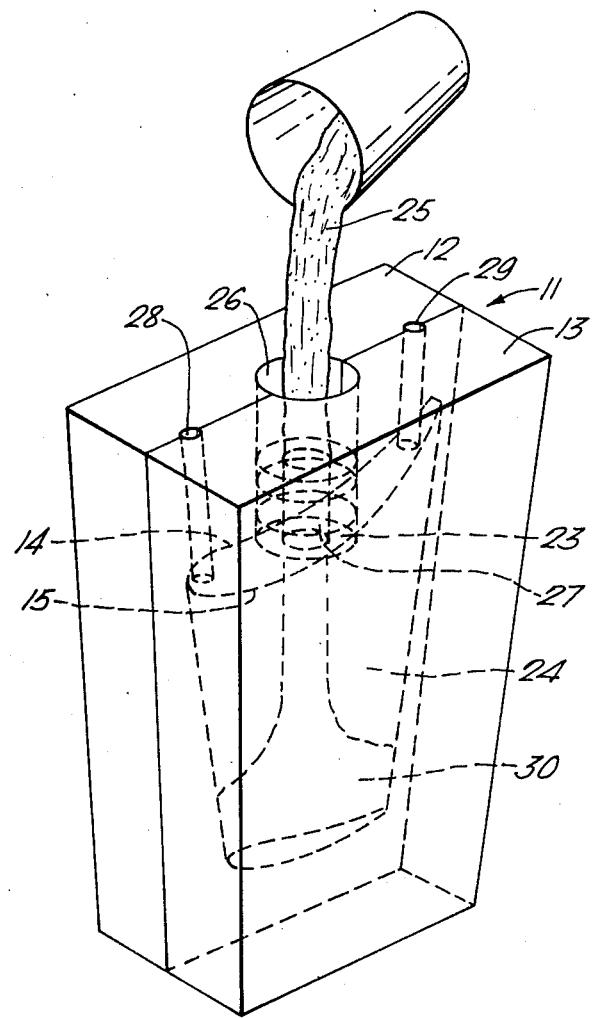
Figure 3:
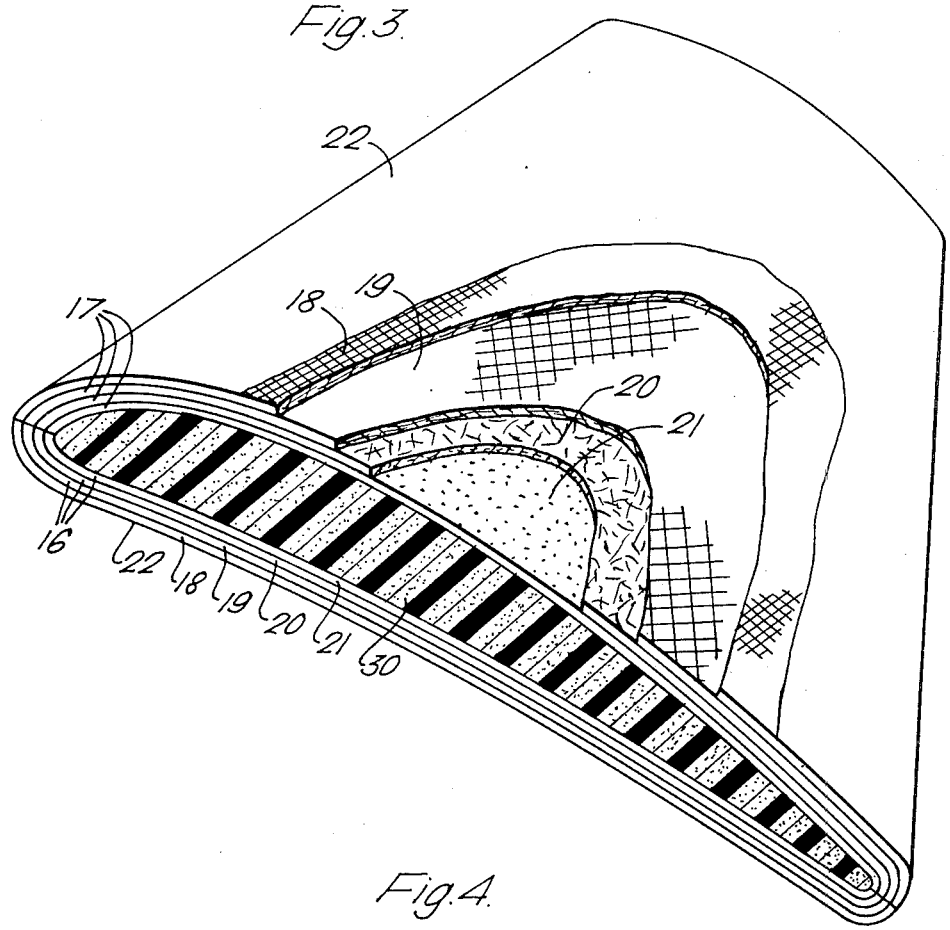
Figure 4:
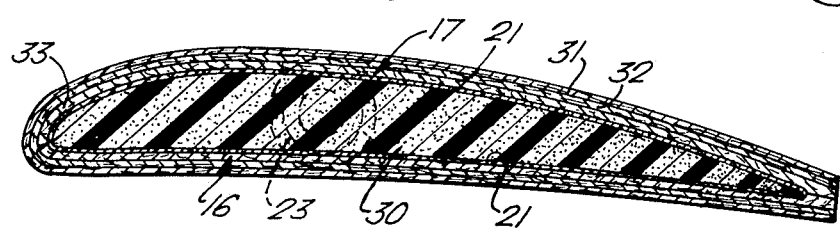

FIG. 2 is a perspective view of the mould parts of FIG. 1 in the closed condition and foamable material being introduced, FIG. 3 is a perspective sectional view of the structure formed in the mould and following removal therefrom, FIG. 4 is a cross-section of said structure so formed with further layers of fibrous material applied thereto, FIG. 5 is a perspective view of the mould parts, again in the closed condition, with said structure replaced therein together with the further layers of fibrous material and with the assembly being subjected to a resin-injection process.

In this embodiment the foam-containing structure being made is a blade for an aircraft propeller.

Referring to the drawings the single mould 11, which is to be used for making the blade, comprises first and second complementary parts 12, 13 shown in the open condition in FIG. 1. These parts are of glass-fibre-reinforced plastics material and the moulding surfaces 14 and 15 thereof are wax-polished to a very smooth finish, thus being impervious.

It is intended to lay up suitably-shaped preformed sheets 16, 17 of dry or substantially dry fibrous material each carrying a sacrificial scrim cloth layer 18. Each of preformed sheets 16, 17 comprises a number of sections which have already been united at adjacent edge portions by suitably heat-bonding using a polyester binder.

The sheets 16, 17 each include one layer 19 of woven glass-fibre material held together to prevent fraying during preparatory cutting thereof by a thin chopped glass strand backing layer 20 bonded to the glass-fibre material by a soluble binder. This binder consists of a polyester powder which has been spread over the glass-fibre surface and the bonding having been achieved by heating to 180° C.

The sheets 16, 17 also each include a layer 21 of glass-fibre filter paper disposed adjacent backing layer 20. Each layer 19, complete with its backing layer, is of a thickness in the range 0.010 to 0.025 inches. Each layer 21 is approximately 0.008 inches thick and is of such character that it is of substantially uniform porosity throughout and will filter out particles of a size in excess of 0.1 microns.

As the first step in the moulding process a polyester gel 22 is applied to surfaces 14 and 15. When this gel has reached a tacky consistency, preformed sheets 16, 17, each with its sacrificial scrim cloth layer 18, are respectively placed in mould parts 12, 13 with layer 18 in direct engagement with the tacky polyester gel 22, and filter paper layers 21 respectively furthermost from surfaces 14, 15. The gel penetrates through layers 18 to layers 19, 20 so that layers 18 and sheets 16, 17 are firmly retained with respect to surfaces 14, 15 by the gel.

An aluminium spool-like member 23, intended to form a root portion by which the blade when finished will be mounted in a hub, is now introduced to mould 11 and parts 12, 13 thereof closed together as shown in FIG. 2. Since sheets 16 and 17 are still firmly retained with respect to surfaces 14 and 15 by the gel-impregnated scrim cloth layer 18, a cavity 24 is formed between the sheets.

A mixed polyurethane material 25, which includes a foaming agent, is next poured through an aperture 26, formed in mould 11, and through the hollow interior 27 of member 23 into cavity 24. As pouring continues air in consequence displaced is permitted to escape to atmosphere by way of vent holes 28 and 29 provided in the mould. When filling of cavity 24 and of the interior 27 of member 23 is complete, the polyurethane material 25 is caused by the foaming agent therein to expand. This takes place at a temperature of 60° C. over a period of one hour.

During the foaming of material 25 filter paper layers 21 serve to limit the amount of foam material which is permitted substantially to penetrate layers 19 of glass-fibre material backed by layers 20. The layers 21 further ensure that uneven penetration is also avoided. Thus a controlled and substantially uniform depth of penetration of the foam material into layers 19/20 is achieved, affording a reliable keying effect between them. In this embodiment the foam material only penetrates partly through each of backed layers 19/20.

The mould 11 is now opened and the formation, as shown in FIG. 3, complete with its foam core 30 and member 23, is removed therefrom, the gel 22 ensuring that surfaces 14 and 15 of mould parts 12 and 13 have no parts of sacrificial scrim cloth layers 18 adhering thereto. Since the gel penetrates through layers 18, it facilitates the next step in the process which is the stripping of those layers completely from layers 19. This leaves layers 19 and their backing layers 20 keyed to foam core 30.

Two further layers 31, 32 of dry or substantially dry woven glass-fibre material are now wrapped around the formation, providing continuity of material as shown in FIG. 4 around the portion indicated at 33 which will form the leading edge of the finished blade. These two layers 31, 32 are each of a thickness in the range 0.010 to 0.025 inches.

Following removal of any residual gel 22 from surfaces 14, 15 of mould parts 12, 13, the assembly as shown in FIG. 4 is placed in the mould with the outermost layer 31 in direct engagement with those surfaces. FIG. 5 shows the re-closed mould 11 with an inlet pipe 34 which is connected to the lower end of the mould and which is arranged to receive an epoxide resin 35 under pressure from a suitable source (not shown). An outlet pipe 36 is taken from the upper end of the mould to a vacuum pot (not shown).

The mould is now suitably sealed and the arrangement is such that upon epoxide resin 35 being next introduced under pressure into pipe 34, layers 19, 20, 31 and 32 are subjected to a resin-injection process, surplus resin passing out from the mould through pipe 36 to the vacuum pot. During this injection process foam core 30 is sufficiently dense in character that no resin-impregnation thereof occurs, as is the case with the foam in layers 19/20.

Immediately following this resin-injection process, curing of the resin occurs at 60° C. over a period of 16 hours. Thereafter mould 11 is re-opened and the finished blade 37 removed therefrom. Since surfaces 14, 15 of mould parts 12, 13 have a very smooth finish, removal of the blade so formed from the mould is accomplished with ease and the resultant external surface of the blade is very smooth.

Since only one mould is required for making the blade, production costs are reduced as compared with processes in which a foam core, requiring its own special mould, is preformed and fibrous layers laid up thereupon before placing in a further mould.

Also since the glass-fibre filter paper affords controlled and substantially uniform depth of penetration of foam material into layers 19/20, substantially even weight distribution in the finished blade is achieved. Also, since uneven concentrations of foam material in the blade structure are avoided, a relatively strong fibrous-reinforced plastics blade structure is achieved.

The invention is not limited to the numbers of layers of woven glass-fibre material and glass-fibre filter paper of the embodiment above-described with reference to the drawings, or to the depth of penetration of the foam material, as in other embodiments other suitable numbers of said layers may with advantage be used, the characteristics of the filter paper being chosen to produce the desired depth of penetration of foam material into the respective layer or layers of woven material.

Again instead of providing layers of woven glass-fibre material, in alternative embodiments layers of uni-directional glass-fibre material, or, a combination of woven and uni-directional material, suitably held together, may be used.

Although in the embodiment above-described with reference to the drawings, the single mould used is of glass-fibre-reinforced plastics material, in other embodiments the mould may be of plastics material reinforced by a suitable material other than glass-fibre, or may be of a metallic material.

The invention is not limited to the provision of a filter layer or layers of glass-fibre paper, as in other embodiments any other suitable material which affords desired control upon the foam material passing therethrough may instead be used. Also, each filter layer may be provided with a backing layer, for example, of chopped glass strand material, on that face thereof remote from the respective mould part.

Yet again none of the fibrous material used in the formation of the foam-containing structure need be of glass-fibre as in other embodiments other suitable fibrous material may with advantage be used.

Although in the embodiment above-described with reference to the drawings, the formation is removed from the mould following expansion of the foamable material to enable further fibrous layers to be applied to the formation, followed by replacement in the mould for the resin-injection step, in other embodiments of the invention the formation is not so removed from the mould for the application of any further layers and thus the resin-injection step may immediately follow the expansion of the foamable material, or, the resin-injection step may be omitted.

Finally, although in the embodiment above-described with reference to the drawings parting of the formation from the mould following expansion of the foamable material is facilitated by the use of a gel and a sacrificial scrim cloth layer, in other embodiments other parting agents may be used but these may require other means, for example vacuum means, for effecting positive retention of the fibrous layers in the mould parts until expansion of the foamable material has been completed.

I claim:

1. A method of making a foam-containing structure comprising: (a) placing and suitably retaining a respective shaped sheet in each of first and second complementary parts of an open mould which parts present impervious moulding surfaces, each said sheet including at least one layer of fibrous material and, on that face of said one layer remote from the respective mould part, at least one filter layer having substantially uniform porosity throughout, (b) closing said two mould parts together with said sheets still retained therein so that said sheets together define a cavity therebetween, (c) introducing a foamable material into said cavity, (d) causing said foamable material within said cavity to expand to a foamed state, so that some of that material during expansion thereof passes by way of the filter layers over the entire surface area of the filter layers thereby to penetrate said fibrous material to a substantial depth, said filter layers serving to limit the extent to which the expanded material penetrates said fibrous material and serving also to ensure that such penetration takes place to a substantially uniform depth over the entire area of the fibrous material thereby to integrate the expanded material and the fibrous material, and, (e) removing the formation of sheets and expanded material so produced from the mould.

2. A method as claimed in claim 1, wherein at least one further layer of fibrous material thereafter is wrapped around said formation, and the formation, with said further layer, then replaced in said mould, followed by subsequent removal therefrom.

3. A method as claimed in claim 1, wherein before the said removing of said formation of sheets and expanded material from said mould, said fibrous material is subjected to a resin-injection process which is followed by curing of the resin so injected.

4. A method as claimed in claim 1, wherein a sacrificial layer is applied to each said sheet before placing it in its respective mould part, the sacrificial layers facilitating subsequent removal of said formation from the mould.

5. A method as claimed in claim 4, wherein said sacrificial layers are of scrim cloth and the surfaces of said mould parts which receive said sheets and sacrificial layers are coated with a gel which is permitted to become tacky and which penetrates the sacrificial layers on placing said sheets in the mould parts, thereby to retain said sacrificial layers and said sheets with respect to those parts.

6. A method as claimed in claim 1, wherein said filter layers comprise glass-fibre filter paper.

7. A method as claimed in claim 1, wherein said layers of fibrous material comprise woven glass-fibre material.

8. A method as claimed in claim 7, wherein said layers of woven glass-fibre material are each held together by a thin chopped glass strand backing layer bonded thereto.

9. A method as claimed in claim 2, wherein the or each said further layer of fibrous material comprises woven glass-fibre material.

10. A method as claimed in claim 1, wherein each said shaped sheet comprises a number of sections which have been united at adjacent edge portions by suitably heat-bonding.

11. A method as claimed in claim 1, wherein said foamable material comprises a mixed polyurethane material which includes a foaming agent.

12. A method as claimed in claim 1, wherein said foamable material is introduced into said cavity by pouring through an aperture suitably formed in the mould and through the hollow interior of a member intended to form part of the finished structure.

13. A blade, suitable for a propeller, produced by a method as claimed in claim 1.

* * * * *